(12) United States Patent
Corner

(10) Patent No.: US 7,393,800 B2
(45) Date of Patent: Jul. 1, 2008

(54) FLAME RESISTANT FABRICS HAVING INCREASED STRENGTH AND ABRASION RESISTANCE

(75) Inventor: Chris Corner, Atlanta, GA (US)

(73) Assignee: Southern Mills, Inc., Union City, GA (US)

( * ) Notice: Subject to any disclaimer, the term of this patent is extended or adjusted under 35 U.S.C. 154(b) by 377 days.

(21) Appl. No.: 10/269,213

(22) Filed: Oct. 3, 2002

(65) Prior Publication Data

US 2003/0232560 A1 Dec. 18, 2003

Related U.S. Application Data

(63) Continuation-in-part of application No. 10/165,795, filed on Jun. 7, 2002, now abandoned.

(51) Int. Cl.
*D03D 15/12* (2006.01)
(52) U.S. Cl. .............. 442/302; 442/189; 442/190; 442/191; 442/199; 442/203; 442/301; 428/920; 428/921; 252/608; 57/238; 57/244
(58) Field of Classification Search ........... 442/190, 442/191, 301, 302, 189, 199; 428/920, 921; 252/608; 57/238, 244
See application file for complete search history.

(56) References Cited

U.S. PATENT DOCUMENTS

| | | | | |
|---|---|---|---|---|
| 4,304,811 A | * | 12/1981 | David et al. | 442/102 |
| 5,141,542 A | * | 8/1992 | Fangeat et al. | 57/224 |
| 5,299,602 A | | 4/1994 | Barbeau et al. | 139/430 |
| 5,928,971 A | | 7/1999 | Ellis et al. | 442/76 |
| 6,410,140 B1 | * | 6/2002 | Land et al. | 428/377 |
| 6,460,321 B1 | * | 10/2002 | Koshimae et al. | 57/210 |
| 6,624,096 B2 | * | 9/2003 | Thomas et al. | 442/181 |
| 6,691,307 B2 | * | 2/2004 | Long | 717/159 |

FOREIGN PATENT DOCUMENTS

JP   409310236 A  * 12/1997

* cited by examiner

*Primary Examiner*—Andrew T Piziali
(74) *Attorney, Agent, or Firm*—Thomas, Kayden, Horstemeyer & Risley, LLP

(57) ABSTRACT

Flame resistant fabrics are disclosed. In one embodiment, a flame resistant fabric includes a plurality of flame resistant body yarns that form a body of the fabric, and a plurality of relatively tough yarns provided in discrete positions within the fabric body, wherein the relatively tough yarns do not protrude beyond an outer surface of the fabric body so as to reduce the susceptibility of the relatively tough yarns to abrasion.

20 Claims, 4 Drawing Sheets

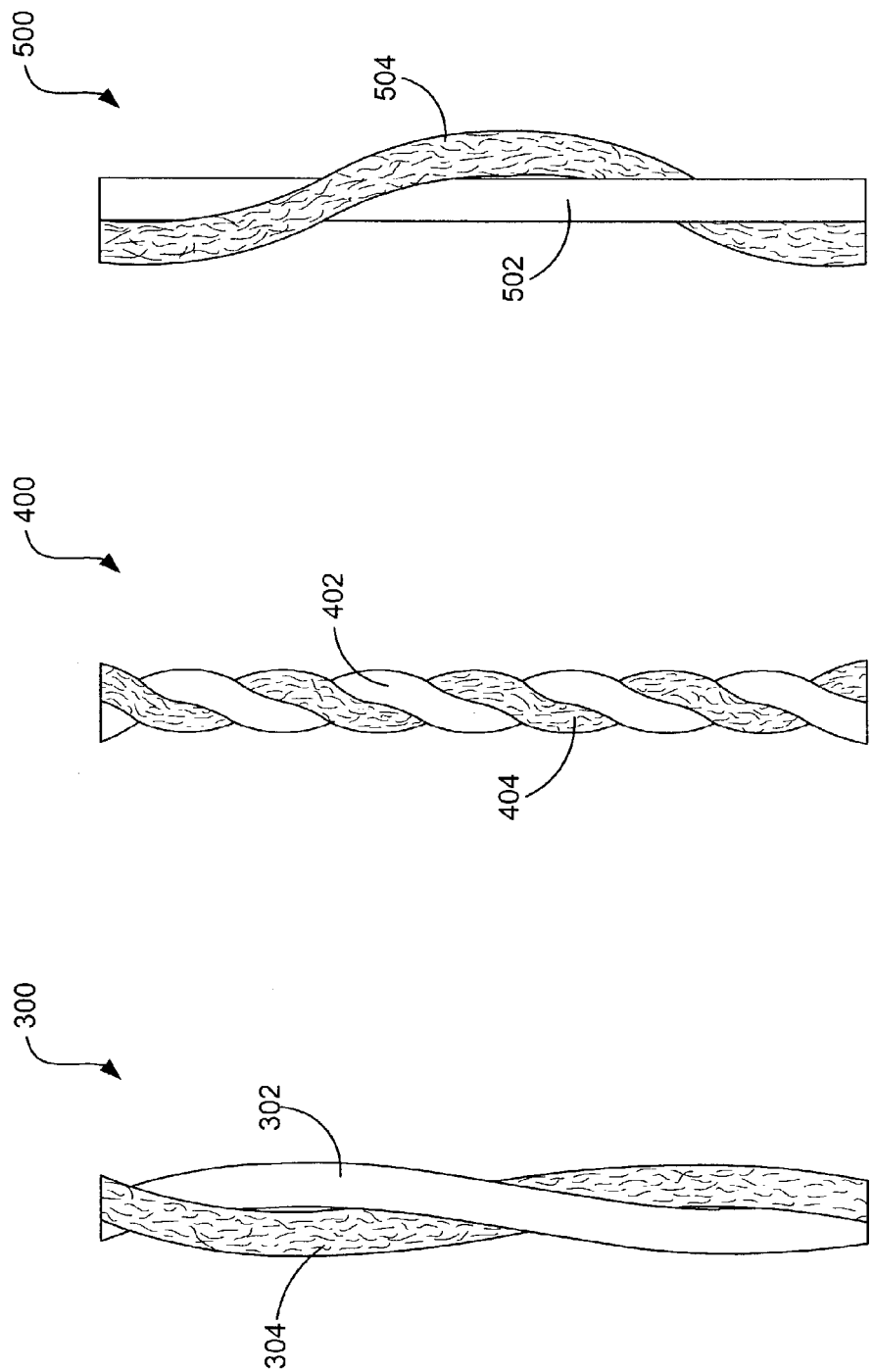

FLAME RESISTANT FABRICS HAVING INCREASED STRENGTH AND ABRASION RESISTANCE

CROSS-REFERENCE TO RELATED APPLICATION

This application is a continuation in part of U.S. patent application Ser. No. 10/165,795, filed Jun. 7, 2002, now abandoned, entitled "Flame Resistant Fabrics Comprising Filament Yarns," which is entirely incorporated herein by reference.

FIELD OF THE INVENTION

The present invention generally relates to flame resistant fabrics. More particularly, the present invention relates to flame resistant fabrics that have both increased strength and increased resistance to abrasion.

BACKGROUND OF THE INVENTION

Several occupations require the individual to be exposed to extreme heat and/or flames. To avoid being injured while working in such conditions, these individuals typically wear protective garments constructed of special flame resistant materials designed to protect them from both heat and flame.

To cite an example, firefighters typically wear protective garments commonly referred to in the industry as turnout gear. Such turnout gear normally comprises various garments including, for instance, coveralls, trousers, and jackets. These garments usually include several layers of material including, for example, an outer shell that protects the wearer from flames, a moisture barrier that prevents the ingress of water into the garment, and a thermal barrier that insulates the wearer from the extreme heat.

Turnout gear outer shells typically comprise woven fabrics formed of one or more types of flame resistant fibers. In addition to shielding the wearer from flames, the outer shells of firefighter turnout gear further provide abrasion resistance. In that the outer shell must withstand flame, excessive heat, and abrasion, it must be constructed of a flame resistant material that is both strong and durable. The National Fire Protection Association (NFPA) provides guidelines as to the strength a fabric must have in order to be used in the construction of outer shells. According to NFPA 1971, 2000 edition, the fabric must exhibit a tensile strength of at least 140 pounds (lbs.) in the warp and filling directions, and a trapezoidal tear strength of at least 22 lbs. in the warp and filling directions. The NFPA provides detailed guidelines as to the manner in which testing is to be conducted to determine both tensile strength and tear strength.

As is known in the art, the strength of fabrics, including flame resistant fabrics, can be increased by incorporating high strength yarns in the body of the fabric. For instance, a grid pattern of these high strength yarns can be incorporated into the fabric body to produce what is commonly referred to in the art as a rip-stop fabric. Normally, the high strength yarns comprise relatively heavy weight yarns. With such construction, the resultant fabric will exhibit greater tensile strength. In addition, rips that would normally propagate through the fabric may be halted by the provision of the high strength yarns, thereby increasing the tear strength of the fabric.

Although the provision of high strength yarns in the fabric body can increase both tensile strength and tear strength, rip-stop fabrics can be susceptible to abrasion. The reason for this is that the high strength yarns typically protrude beyond the surface of the fabric body so as to be more susceptible to snagging or otherwise being abraded during fabric use. Such abrasion susceptibility is disadvantageous in that it affects the long term durability of the garment constructed of the fabric and can reduce both the strength and the thermal resistance of the garment.

In view of the above, it can be appreciated that it would be desirable to have a fabric that provides the increased strength that is achieved when high strength yarns are incorporated into the fabric body, but that does not suffer from the abrasion drawbacks commonly encountered with rip-stop fabrics.

SUMMARY OF THE INVENTION

The present disclose relates to flame resistant fabrics. In one embodiment, a flame resistant fabric includes a plurality of flame resistant body yarns that form a body of the fabric, and a plurality of relatively tough yarns provided in discrete positions within the fabric body, wherein the relatively tough yarns do not protrude beyond an outer surface of the fabric body so as to reduce the susceptibility of the relatively tough yarns to abrasion.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 3 is a schematic representation of a first relatively tough yarn that can be used to form the fabric of FIG. 2.

FIG. 4 is a schematic representation of a second relatively tough yarn that can be used to form the fabric of FIG. 2.

FIG. 5 is a schematic representation of a third relatively tough yarn that can be used to form the fabric of FIG. 2.

DETAILED DESCRIPTION OF THE INVENTION

Figure 1:
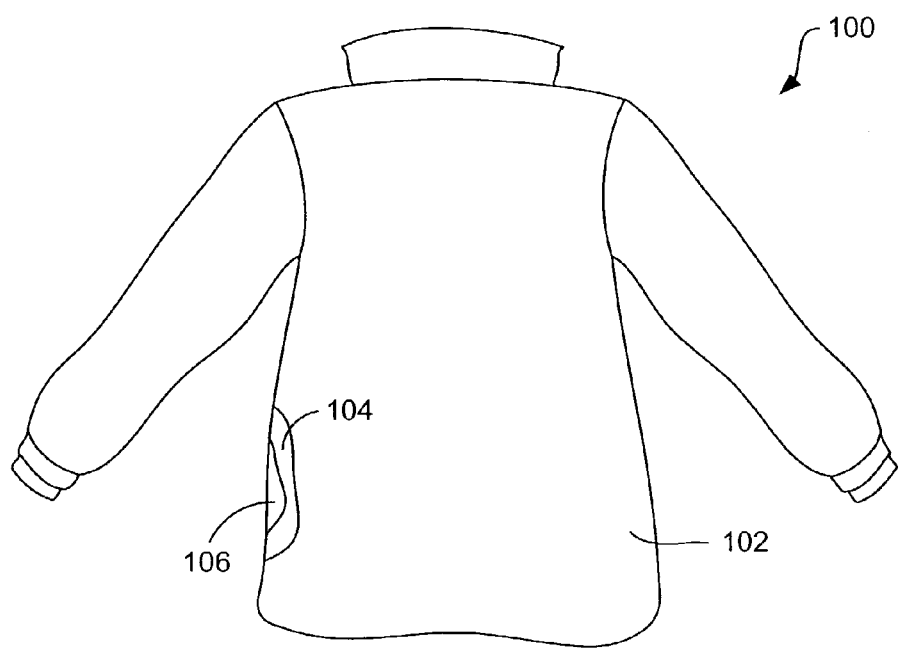
FIG. 1 is a rear view of an example protective garment.

FIG. 1 illustrates an example protective garment 100. More particularly, FIG. 1 illustrates a firefighter turnout coat that can be donned by firefighter personnel when exposed to flames and extreme heat. It is noted that, although a firefighter turnout coat is shown in the figure and described herein, the present disclosure pertains to protective garments generally. Accordingly, the identification of firefighter turnout gear is not intended to limit the scope of the disclosure.

As indicated in FIG. 1, the garment 100 generally comprises an outer shell 102 that forms the exterior surface of the garment, a moisture barrier 104 that forms an intermediate layer of the garment, and a thermal liner 106 that forms the interior surface (i.e., the surface that contacts the wearer) of the garment. In that it forms the exterior surface of the garment 100, the outer shell 102 preferably is constructed so as to be flame resistant to protect the wearer against being burned. In addition, the outer shell 102 preferably is strong and durable so as to be resistant to tearing and abrasion during use in extreme environments.

The strength of a fabric, including flame resistant fabrics, can be increased by providing relatively tough yarns in the fabric body, for instance in a grid pattern. As noted above, however, protruding yarns can increase the fabric's susceptibility to abrasion and therefore reduce the durability of the fabric. If such relatively tough yarns could be incorporated into a given fabric without them protruding beyond the outer surface of the fabric, stronger flame resistant fabrics could be used to construct protective garments without sacrificing abrasion resistance. As is described in detail below, this goal can be achieved by providing in the fabric discretely-positioned relatively tough yarns that, unlike common rip yarns, do not protrude beyond the outer surface of the fabric body. As is known in the art, "toughness" is a property that pertains to a material's (in this case yarn's) ability to resist breakage. The term "relatively tough" is used herein to describe yarns that have higher toughness than the remainder of the yarns (i.e., body yarns) of the fabric. With such construction, a relatively flat fabric outer surface can be obtained such that the relatively tough yarns, or any other yarns for that matter, will not be particularly susceptible to abrasion.

Figure 2:
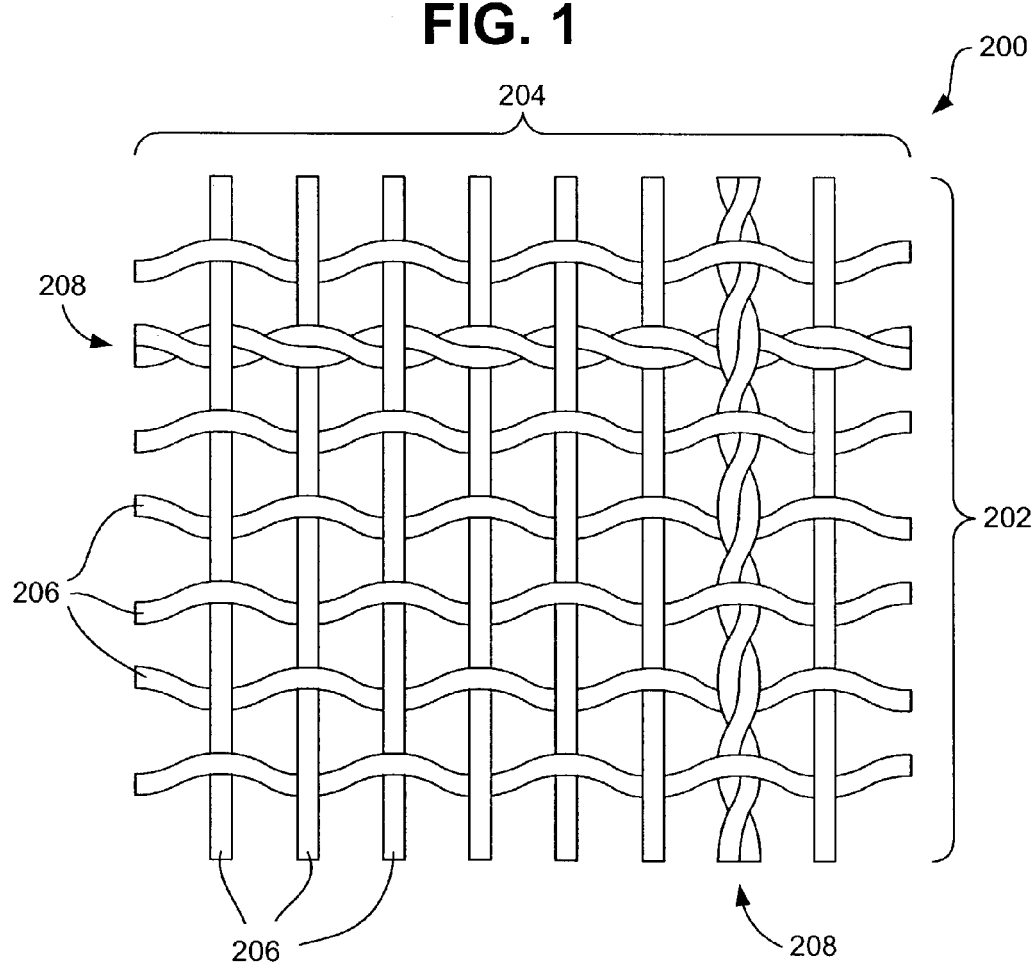
FIG. 2 is a schematic representation of a fabric that can be used in the construction of the garment of FIG. 1.

FIG. 2 is a schematic view of an example fabric 200 that can be used in the construction of the protective garment 100, and more particularly the outer shell 102, shown in FIG. 1. As noted above, however, the fabric 200 could be used in the construction of other protective garments either by itself or in combination with other fabrics. As indicated in the figure, the fabric 200 can be formed as a plain weave fabric that comprises a plurality of body yarns 206, including picks 202 and ends 204. Although a plain weave is illustrated and described herein, it will be appreciated that other configurations could be used including, for instance, a twill weave configuration.

Generally speaking, the majority of the body yarns 206 comprise spun yarns that are constructed of a flame resistant material such as meta-aramid, para-aramid, polynosic rayon, flame resistant cellulosic materials (e.g., flame resistant cotton or acetate), flame resistant wool, flame resistant polyester, polyvinyl alcohol, polytetrafluoroethylene, polyvinyl chloride (PVC), polyetheretherketone, polyetherimide, polysulfar, polychlal, polyimide, polyamide, polyimideamide, polyolefin, polybenzoxazole (PBO), polybenzimidazole (PBI), carbon, modacrylic, melamine, or other suitable flame resistant material. Most preferably, the spun yarns are composed of at least one of meta-aramid, para-aramid, PBI, and PBO. Each body yarn 206 can comprise a single yarn or two or more individual yarns that are twisted, or otherwise combined, together. Typically, the body yarns 206 comprise one or more yarns that each have a yarn count in the range of approximately 5 to 60 cc, with 8 to 40 cc being preferred. By way of example, the body yarns 206 can comprise two yarns that are twisted together, each having a yarn count in the range of approximately 10 to 25 cc.

In addition to the body yarns 206, provided in both the warp and filling directions of the fabric 200 are relatively tough yarns 208 whose construction is described in greater detail below.

The arrangement of the relatively tough yarns 208 within the fabric 200 can be varied depending upon the desired physical properties. In the arrangement shown in FIG. 2, the fabric 200 is constructed such that the relatively tough yarns 208 are arranged in a grid pattern in which several body yarns 206 are placed between each consecutive relatively tough yarn 208 in both the warp and filling directions of the fabric. As an example, one relatively tough yarn 208 is provided in the fabric in both the warp and filling directions of the fabric for every approximately seven to nine body yarns 206. Alternatively, two or more relatively tough yarns 208 can be woven along with each other in the fabric 200 to form a rip-stop fabric (see FIG. 8). Typically, the grid pattern is arranged so as to comprise a plurality of squares. To accomplish this, a greater number of body yarns 206 may need to be provided between consecutive relatively tough yarns 208 in the filling direction as compared to the warp direction.

Irrespective of the pattern of the relatively tough yarns 208, these yarns are be configured so that they do not protrude beyond the outer surface of the fabric 200. As will be readily appreciated by persons having ordinary skill in the art, this end result can be achieved in a variety of different ways. As a general matter, the fabric is constructed such that its structure shields the relatively tough yarns 208 from abrasion. In one solution, the relatively tough yarns 208 can be constructed so as to have effective diameters that are equal to or less than those of the body yarns 206 that form the body of the fabric 200. In another solution, the linear density and/or weight of the relatively tough yarns 208 is less than or equal to that of the body yarns 206, assuming each has the same specific gravity.

FIGS. 3-7 illustrate various examples of relatively tough yarns that can be used in the fabric shown in FIG. 2. Beginning with FIG. 3, shown is a relatively tough yarn 300 that comprises first and second yarns 302 and 304, which are plied together. To achieve maximum strength without sacrificing processability, the first yarn 302 can comprise a filament yarn and the second yarn 304 can comprise a spun yarn. Use of filament yarns in this and other manners is described in detail in the assignee's U.S. patent application Ser. No. 10/165,795, filed Jun. 7, 2002, which has been incorporated by reference. Although referred to in the singular, the terms "filament yarn" and "spun yarn" are to be understood to include a filament yarn that includes one or more individual continuous filaments and one or more staple fiber spun yarns, respectively. Accordingly, a given filament yarn 302 can comprise a monofilament yarn or a multifilament yarn, and a given spun yarn 304 can include a single spun yarn or a plurality of spun yarns that are twisted together to form a composite yarn. In any case, the yarns 302 and 304 of the relatively tough stop yarn 300 can be, as shown in FIG. 3, loosely twisted together so as to form an integral yarn that can be used as a pick or end as the case may be.

FIG. 4 illustrates a variant of the relatively tough yarn 300 shown in FIG. 3. In particular, the relatively tough yarn 400, like yarn 300, includes first and second yarns 402 and 404 which can, for instance, comprise a filament yarn and a spun yarn. However, the relatively tough yarn 400 is formed as a tightly twisted yarn such that the first yarn 402 and second yarn 404 are more intimately associated along the length of the relatively tough yarn.

Figure 6:
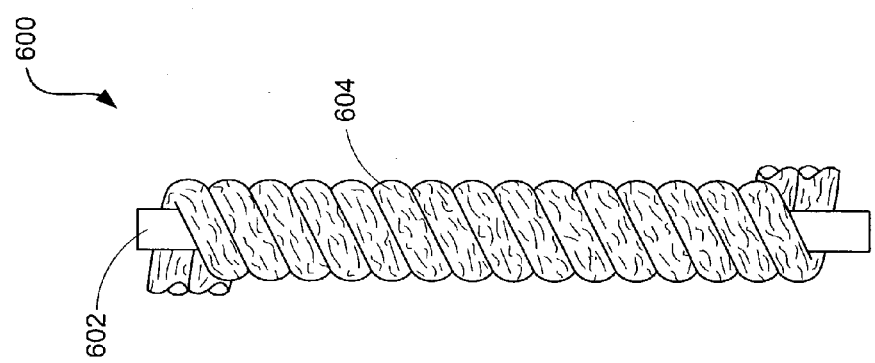
FIG. 6 is a schematic representation of a fourth relatively tough yarn that can be used to form the fabric of FIG. 2.

FIG. 5 illustrates a relatively tough yarn 500 in which a first (e.g., filament) yarn 502 is loosely wrapped with a second (e.g., spun) yarn 504 to create a core-wrapped arrangement. FIG. 6 illustrates a more tightly core-wrapped arrangement of a relatively tough yarn 600 that includes a core yarn 602 that is substantially completely surrounded by a pair of yarns 604. Although two yarns 604 are shown wrapped around the core yarn 602 in FIG. 6, it will be appreciated that fewer or greater such yarns could be wrapped around the core yarn in this manner.

In each of the arrangements shown in FIGS. 3-6, various different yarn compositions and weights may be used to obtain advantageous results. Where the relatively tough yarns comprise filament yarns, each filament yarn can be composed of a strong material such as meta-aramid, para-aramid, polyolefin (e.g., high density polyethylene), flame resistant polyester, polytetrafluoroethylene, polyetheretherketone, polyetherimide, polysulfar, polyimide, polyarnide, polyimideamide, polybenzoxazole (PBO), polybenzimidazole (PBI), carbon, glass, or other suitable material. Of these, meta-aramid (e.g., Nomex™) or para-aramid (e.g., Kevlar™) filament, PBO filament, carbon, glass, and high density polyethylene (e.g., Spectra™ or Dynemma™) are preferred. The weight of the filament yarns typically is in the range of approximately 50 to 1000 denier, with the range of 100 to 600 denier being preferred.

Where the relatively tough yarns comprise spun yarns, each spun yarn can, like body yarns 206 identified in FIG. 2, be composed of a material such as meta-aramid, para-aramid, polynosic rayon, flame resistant cellulosic materials (e.g., flame resistant cotton or acetate), flame resistant wool, flame resistant polyester, polyvinyl alcohol, polytetrafluoroethylene, polyvinyl chloride (PVC), polyetheretherketone, polyetherimide, polysulfar, polychlal, polyimide, polyarnide, polyimideamide, polyolefin, (i.e., high density polyethylene) polybenzoxazole (PBO), polybenzimidazole (PBI), carbon, modacrylic, melamine, or other suitable flame resistant material. Normally, each spun yarn of the given relatively tough yarn (300, 400, 500, 600) has a yarn count in the range of 5 to 60 cc, with the range 8 to 55 cc being preferred.

Figure 7:
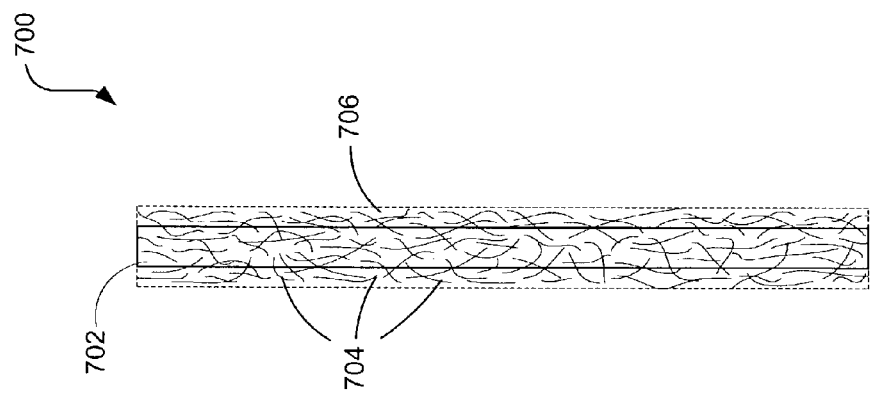
FIG. 7 is a schematic representation of a fifth relatively tough yarn that can be used to form the fabric of FIG. 2.

FIG. 7 illustrates another alternative relatively tough yarn 700 that includes a core (e.g., filament) yarn 702 about which a plurality of individual staple fibers 704 are spun to form a fiber sheath 706 that surrounds the core yarn. By way of example, the staple fibers can be spun around the core yarn 702 using a dref spin procedure or air jet texturing process. The staple fibers 704 can be constructed of one or more of the various materials identified above for construction of the spun yarns identified above.

Figure 8:
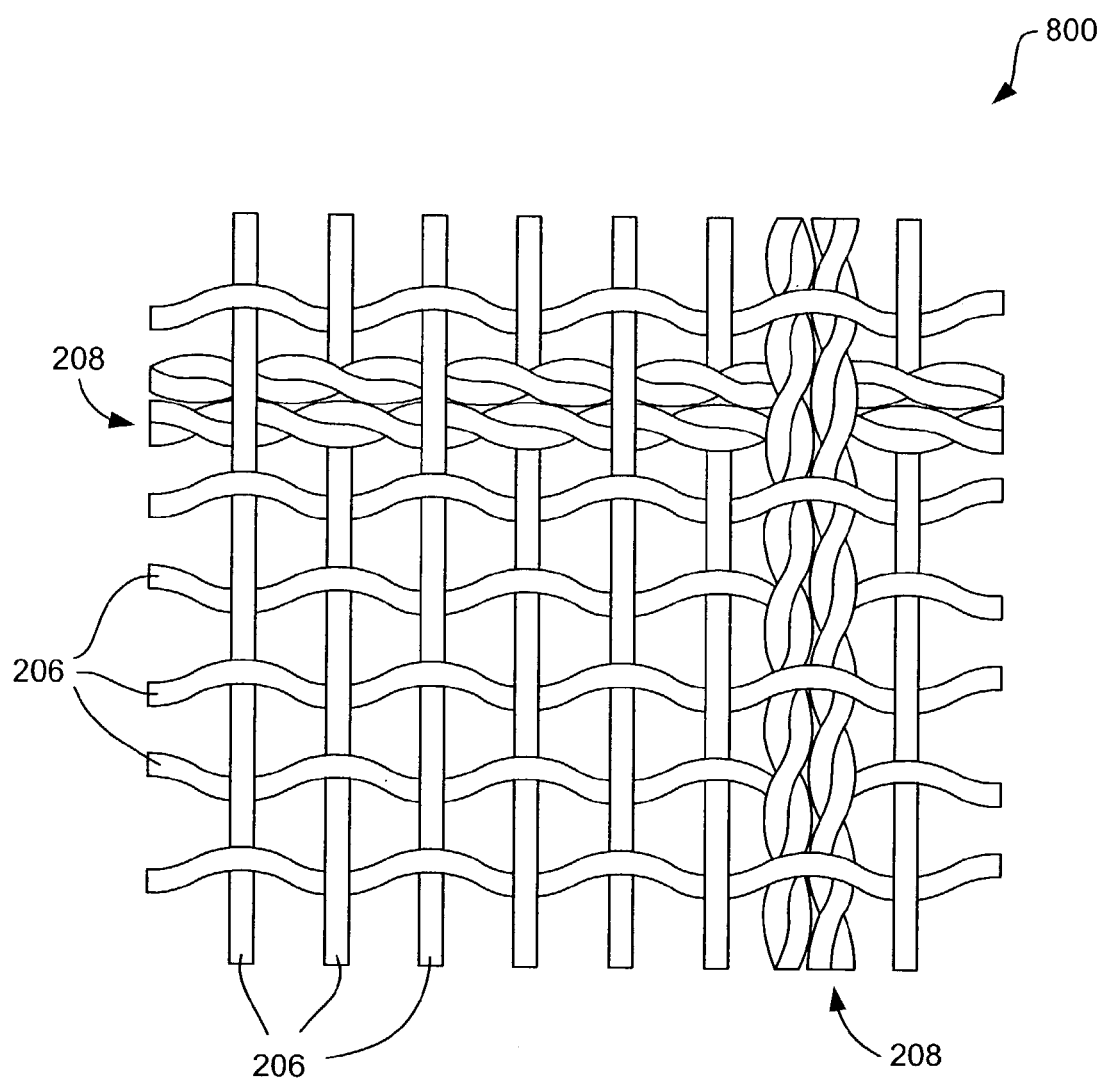
FIG. 8 is a schematic representation of an alternative fabric that can be used in the construction of the garment of FIG. 1.

FIG. 8 is a schematic view of an example rip-stop fabric 800 that can be used in the construction of the protective garment 100. The fabric 800 is similar to the fabric 200 shown in FIG. 2 and therefore comprises body yarns 206 that form the body of the fabric and that have composition and construction similar to those described above with regard to FIG. 2. In the fabric 800, however, two relatively tough yarns 208 are woven along with each other in a grid pattern within the body of the fabric to form a traditional rip-stop weave. Groups of more than two relatively tough yarns 208 may be used, if desired, to form the grid pattern. With the various configurations and compositions described above, the resultant fabric 800 typically has a weight of approximately 3 to 12 ounces per square yard (osy).

With the arrangements disclosed herein, the tear strength of the fabric is increased due to the provision of the relatively tough yarns. Despite this provision, however, abrasion resistance for the fabric is not reduced in that the relatively tough yarns do not protrude beyond the surface of the fabric body. The following example describes an illustrative fabric that falls within the scope of the disclosure provided above. Included is strength testing data that exhibits the strength that is achieved by the inclusion of the relatively tough yarns. It is noted that the testing data provided herein was obtained through strict compliance with NFPA 1971. In addition, provided is abrasion resistance testing data that were obtained through strict compliance with American Society for Testing and Materials (ASTM) test D3884 using an H-18 abrasion wheel with two 250 gram weights.

Example Fabric

A flame resistant fabric blend of Kevlar™ and PBI was constructed having a fabric weight of approximately 7.6 osy. The blend was made as a 1×1 rip-stop fabric having a composition comprising 44 ends per inch and 36 picks per inch, with 8 body yarns provided between a single relatively tough yarn in both the warp direction and the filling direction. Each of the body yarns comprised two 60/40 Kevlar T-970™/PBI yarns having a yarn count of 15 cc (i.e., 15/2). Each relatively tough yarn comprised a Kevlar™ filament yarn having a weight of 400 denier twisted with a 21 cc, 60/40 Kevlar T-970™/PBI spun yarn.

The strength testing results for the fabric are provided in Table I for the example fabric. Table II provides abrasion resistance results.

TABLE I

| Fabric Strength | | |
|---|---|---|
| | Warp (lbs.) | Filling (lbs.) |
| Trapezoidal Tear Strength | 59.2 | 62.3 |
| Tensile Strength | 344.24 | 313.2 |

TABLE II

| Abrasion Resistance | |
|---|---|
| Cycles to first yarn break | 369.7 |

As can be appreciated from Tables I and II, the example fabric described above provides both high strength and desirable abrasion resistance. In particular, the abrasion resistance is vastly improved, a first yarn break only occurring after approximately 370 cycles as compared to approximately 285 for a conventional rip-stop flame resistant fabric.

While particular embodiments of the invention have been disclosed in detail in the foregoing description and drawings for purposes of example, it will be understood by those skilled in the art that variations and modifications thereof can be made without departing from the scope of the invention as set forth in the following claims.

The invention claimed is:

1. A flame resistant woven fabric, comprising:
   a plurality of flame resistant body yarns that form a body of the fabric; and
   a plurality of relatively tough yarns provided in discrete positions within the fabric body, the relatively tough yarns comprising a filament yarn and a spun yarn that are plied together;
   wherein the relatively tough yarns do not protrude beyond an outer surface of the fabric body so as to reduce the susceptibility of the relatively tough yarns to abrasion.

2. The fabric of claim 1, wherein the body yarns comprise spun yarns that are composed of at least one of meta-aramid, para-aramid, polynosic rayon, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, and melamine.

3. The fabric of claim 1, wherein the body yarns are composed of at least one of meta-aramid, para-aramid, polybenzimidazole, and polybenzoxazole.

4. The fabric of claim 1, wherein the relatively tough yarns are arranged in a grid pattern within the fabric body.

5. The fabric of claim 4, wherein the grid pattern is formed by single relatively tough yarns.

6. The fabric of claim 4, wherein the grid pattern is formed by groups of two or more relatively tough yarns that are woven along with each other in the fabric body.

7. The fabric of claim 1, wherein the filament yarns are composed of at least one of meta-aramid, para-aramid, polyolefin, flame resistant polyester, polytetrafluoroethylene, polyetheretherketone, polyetherimide, polysulfar, polyimide, polyamide, polyimideamide, polybenzoxazole, polybenzimidazole, carbon, and glass.

8. The fabric of claim 1, wherein the filament yarns are composed of at least one of meta-aramid, para-aramid, glass, polybenzoxazole, carbon, and high density polyethylene.

9. The fabric of claim 1, wherein the filament yarns have a weight in the range of approximately 50 to 600 denier.

10. The fabric of claim 1, wherein the spun yarns are composed of at least one of meta-aramid, para-aramid, polynosic rayon, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, and melamine.

11. The fabric of claim 1, wherein the spun yarns are composed of at least one of meta-aramid, para-aramid, polybenzimidazole, and polybenzoxazole.

12. The fabric of claim 11, wherein the spun yarns have a yarn count of approximately 8 to 55.

13. A protective garment, comprising:
a flame resistant woven fabric including:
 a plurality of flame resistant body yarns that form a body of the fabric; and
 a plurality of relatively tough yarns provided in discrete positions within the fabric body, the relatively tough yarns comprising a filament yarn and a spun yarn that are plied together;
 wherein the relatively tough yarns do not protrude beyond an outer surface of the fabric body so as to reduce the susceptibility of the relatively tough yarns to abrasion.

14. The garment of claim 13, wherein the relatively tough yarns are arranged in a grid pattern within the fabric body.

15. The garment of claim 14, wherein the grid pattern is formed by single relatively tough yarns.

16. The garment of claim 14, wherein the grid pattern is formed by groups of two or more relatively tough yarns that are woven along with each other in the fabric body.

17. The garment of claim 13, wherein the filament yarns are composed of at least one of meta-aramid, para-aramid, glass, polybenzoxazole, carbon, and high density polyethylene.

18. The garment of claim 13, wherein the filament yarns have a weight in the range of approximately 50 to 600 denier.

19. The garment of claim 13, wherein the spun yarns are composed of at least one of meta-aramid, para-aramid, polybenzimidazole, and polybenzoxazole.

20. The garment of claim 13, wherein the spun yarns have a yarn count of approximately 8 to 55.

* * * * *

UNITED STATES PATENT AND TRADEMARK OFFICE
CERTIFICATE OF CORRECTION

PATENT NO.       : 7,393,800 B2                                          Page 1 of 1
APPLICATION NO.  : 10/269213
DATED            : July 1, 2008
INVENTOR(S)      : Corner It is certified that error appears in the above-identified patent and that said Letters Patent is hereby corrected as shown below:

Title Page, Item (75)

Inventors: Should Read:

Chris Corner, Atlanta, GA (US); Michael T. Stanhope, Atlanta, GA (US);
    Charles Dunn, Smyrna, GA (US)

Signed and Sealed this

Second Day of December, 2008

JON W. DUDAS
*Director of the United States Patent and Trademark Office*